United States Patent
Lammel et al.

(10) Patent No.: US 11,959,747 B2
(45) Date of Patent: Apr. 16, 2024

(54) MICROMECHANICAL CLOCKING SYSTEM WITH IMPROVED TIMING PRECISION

(71) Applicant: Robert Bosch GmbH, Stuttgart (DE)

(72) Inventors: Gerhard Lammel, Tuebingen (DE); Timo Giesselmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 459 days.

(21) Appl. No.: 17/273,662

(22) PCT Filed: Dec. 3, 2019

(86) PCT No.: PCT/EP2019/083395
§ 371 (c)(1),
(2) Date: Mar. 4, 2021

(87) PCT Pub. No.: WO2020/126454
PCT Pub. Date: Jun. 25, 2020

(65) Prior Publication Data
US 2021/0364294 A1 Nov. 25, 2021

(30) Foreign Application Priority Data
Dec. 20, 2018 (DE) .......................... 102018222608.3

(51) Int. Cl.
*G01L 25/00* (2006.01)
*G01C 19/5776* (2012.01)
(Continued)

(52) U.S. Cl.
CPC ....... *G01C 19/5776* (2013.01); *G01C 25/005* (2013.01); *G02B 26/0833* (2013.01)

(58) Field of Classification Search
None
See application file for complete search history.

(56) References Cited

U.S. PATENT DOCUMENTS

| | | | |
|---|---|---|---|
| 2012/0169387 A1* | 7/2012 | Hara | G06F 1/08 327/156 |
| 2014/0260713 A1 | 9/2014 | Shaeffer et al. | |
| 2015/0048895 A1* | 2/2015 | Huang | H03L 1/028 331/154 |

FOREIGN PATENT DOCUMENTS

| | | |
|---|---|---|
| CN | 105375921 A | 3/2016 |
| DE | 10062347 A1 | 6/2002 |

(Continued)

OTHER PUBLICATIONS

International Search Report for PCT/EP2019/083395, dated Mar. 13, 2020.

*Primary Examiner* — Brandi N Hopkins
*Assistant Examiner* — Nigel H Plumb
(74) *Attorney, Agent, or Firm* — NORTON ROSE FULBRIGHT US LLP; Gerard A. Messina

(57) ABSTRACT

A system having a micromechanical clocking system component a clocking system component. The system includes a micromechanical oscillation element, which is able to be induced to an oscillation with a natural frequency, and a first circuit, which generates from the natural frequency of the oscillation element a clock frequency which is pre-calibrated to a predefined setpoint clock frequency; a memory for the remaining deviation of the clock frequency from the setpoint clock frequency, the deviation having been individually determined for the clocking system component; and a processing unit which generates a reference time basis for at least a part of the system on the basis of the generated clock frequency and the stored deviation.

13 Claims, 2 Drawing Sheets

(51) Int. Cl.
*G01C 25/00* (2006.01)
*G02B 26/08* (2006.01)

(56) References Cited

FOREIGN PATENT DOCUMENTS

| | | |
|---|---|---|
| DE | 102015200944 A1 | 7/2016 |
| JP | 2002185312 A | 6/2002 |
| JP | 2008507713 A | 3/2008 |
| JP | 2010049010 A | 3/2010 |
| JP | 2017227591 A | 12/2017 |
| TW | 201727261 A | 8/2017 |
| WO | 2009116262 A1 | 9/2009 |

* cited by examiner

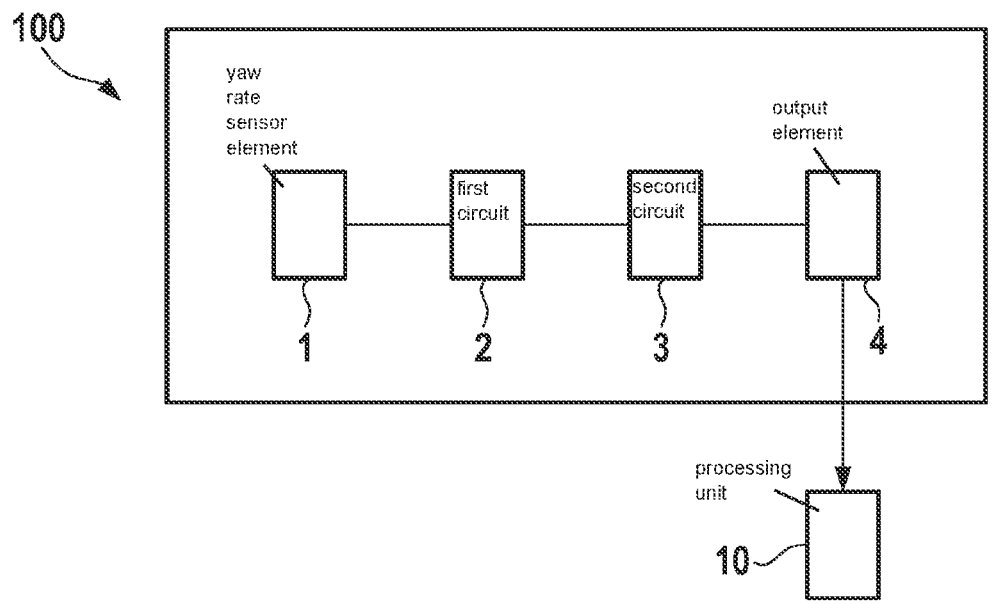
Fig. 1
(CONVENTIONAL)

MICROMECHANICAL CLOCKING SYSTEM WITH IMPROVED TIMING PRECISION

FIELD

The present invention relates to a system having a micromechanical clocking system component, in particular a sensor system. In addition, the present invention relates to a method for operating a sensor system.

BACKGROUND INFORMATION

Essential for the systems under discussion is that they include a micromechanical clocking system component. This may be a micromirror, for example, which is excited to resonant oscillations in the frame of a projection module. In this case, the projection module could be considered to be a system in the sense of the present invention. A further example of a micromechanical clocking system component is a micromechanical yaw rate sensor having a detection mass which is excited to natural frequency oscillations for measuring purposes. Rotary movements of the sensor about an axis oriented in parallel with the excitation plane and perpendicular to the excitation direction are able to be detected as deflections of the seismic mass perpendicular to this excitation plane because such rotary movements induce a correspondingly directed Coriolis force. A yaw rate sensor of this type together with a processing unit for the sensor signals already constitutes a system in the sense of the present invention. However, the system may also include still further sensor components and/or system components having a different functionality.

Generally, the oscillator, made up of the oscillating mass and its spring suspension, has a high quality design in order to minimize the energy for the drive and to maximize the stability of the oscillation. The oscillation frequency of this oscillator is very stable across the temperature and ageing. However, the natural frequency of identically designed sensors is subject to very high variances for production-related reasons.

The natural frequency of the oscillator is normally utilized for deriving the output sampling rate. A fractional phase-locked loop (PLL) is generally used for this purpose, which generates from the oscillation frequency of the oscillator $f\_osc$ a clock having the frequency $f\_odr$ (output data rate) with the ratio n/m:

$$f\_odr = f\_osc * n/m$$

The values n and m are preferably selected as whole numbers and generally determined individually for the parts during the trimming of the yaw rate sensors, by measuring $f\_osc$ and calculating suitable values n and m in order to get $f\_odr$ into a tolerance band around a setpoint clock frequency $f\_odr\_nom$. These values are normally stored in the non-volatile memory for trimming parameters in the sensor.

For design-related reasons, the absolute magnitude of factor n and divisor m is limited because high values would lead to an excessive current consumption and a large chip surface. However, given limited values of n and me, it is also the case that the output sampling rate can be adjusted only with limited precision, i.e., with a certain deviation $a\_odr$ from the setpoint clock frequency or setpoint sampling frequency f odr_nom, such as in a single digit percentage range.

For example, for a natural frequency $f\_osc = 25$ kHz and a setpoint clock frequency $f\_odr\_norm = 6.4$ kHz, the value m would be determined as a function of value n according to the formula:

$$m = \text{round}(f\_osc * n / f\_odr\_nom).$$

In this example, the following results for a selected value n=8 for the value m:

$$m = \text{round}(25 \text{ kHz} * 8 / 6.4 \text{ kHz}) = \text{round}(31.25) = 31$$

However, using the value m=31, an actual output sampling rate of $f\_odr = 6.452$ kHz results, which means that it is higher by approximately 0.8% than the setpoint sampling rate. The deviation $a\_odr$ is defined in the following way:

$$a\_odr = f\_odr / f\_odr\_nom.$$

In the above example, $$a\_odr = 6.452 \text{ kHz} / 6.4 \text{ kHz} = 1.008$$

During the processing of the measured yaw rate signals, an integration of the measured yaw rate values often takes place, for instance as part of an algorithm for determining the orientation in space by the angular position. This orientation, for instance, is able to be described by the roll, pitch and yaw angles (heading). If the integration is implemented by summing the product of the measured yaw rate value and time interval $1/f\_odr\_nom$, but the actual sampling rate $f\_odr$ deviates from $f\_odr\_nom$, then this means that the integration value includes an error factor of $a\_odr$.

Although this error is usually tolerated, it has the disadvantage of causing an imprecision of the integration result.

In order to circumvent this problem, the deviation between the sensor sampling rate and the expected value in practice is measured using a different time normal (e.g., quartz oscillator), for instance, in order to take this deviation into account as a correction for the time constant in the integration of the sensor values. This is disadvantageous insofar as a separate frequency normal is required, the measurement increases the system complexity and partially includes inaccuracies of its own.

SUMMARY

In accordance with the present invention, the micromechanical clocking system component is used for generating a highly precise reference time basis for the system or at least for a part of the system that is independent of the individual parts. In an advantageous manner, this reference time basis is independent of the natural frequency of the individual parts of the clocking system component and also independent of clock reference $f\_odr$ generated from the natural frequency with the aid of a circuit. According to the present invention, the parts-individual deviation $a\_odr$ of clock frequency $f\_odr$ from a specific setpoint clock frequency $f\_odr\_nom$ is provided for this purpose. This deviation $a\_odr$ is normally determined at the end of the manufacturing process of the clocking system component.

According to a first aspect of the present invention, the objective is achieved by a system having a clocking system component
- including a micromechanical oscillation element, which is able to be induced to an oscillation with a natural frequency; and
- a first circuit, which generates from the natural frequency of the oscillation element a clock frequency that is pre-calibrated to a predefined setpoint clock frequency;

a memory for the remaining deviation of the clock frequency from the setpoint clock frequency, the deviation having been individually determined for the clocking system component; and a processing unit, which generates a reference time basis for at least a part of the system on the basis of the generated clock frequency and the stored deviation.

According to a second aspect of the present invention, the objective is achieved by a method for operating a sensor system, which has a micromechanical yaw rate sensor in whose sensor structure at least one oscillation element is developed, in which the oscillation element is induced to oscillations with a natural frequency for the purpose of a measured signal acquisition, in which a clock frequency is generated from the natural frequency of the oscillation element, which is pre-calibrated to a predefined setpoint clock frequency and which determines the output sampling rate for the sensor data of the yaw rate sensor, characterized in that the individually remaining deviation of the clock frequency for the yaw rate sensor from the setpoint clock frequency is made available, and based on the generated clock frequency and the stored deviation, a reference time basis is generated for at least a part of the sensor system.

Advantageous further refinements and embodiments of the system of the present invention are described herein.

In one advantageous refinement of the system in accordance with the present invention, the system is developed as a sensor system, and a yaw rate sensor having a micromechanical sensor structure functions as the clocking system component in that at least one oscillation element is developed in the sensor structure, which is induced to oscillations with a natural frequency for a measured signal acquisition, and in that a circuit is provided, which generates from the natural frequency a clock frequency which determines the output sampling rate for the sensor data of the yaw rate sensor, and the processing unit is designed to process the sensor data on the basis of the reference time basis.

In another advantageous further refinement of the system in accordance with the present invention, the circuit for generating the clock frequency includes at least one phase-locked loop. This makes it possible to generate a highly precise clock frequency.

Another advantageous further refinement of the system is characterized in that the clocking system component and/or the processing unit is/are equipped with a memory for the deviation. This makes it possible to make the deviation available for later use.

Another advantageous further refinement of the system is characterized in that the clocking system component and/or the processing unit has/have access to an external memory for the deviation. In an advantageous manner, the deviation is thereby developed also for access from the outside.

Another advantageous further refinement of the system is characterized in that at least one further system component is provided, which generates an independent time basis, and the independent time basis of the further system component is able to be calibrated and/or corrected on the basis of the reference time basis. This advantageously makes it possible to operate the further system component with very high precision.

Another advantageous further refinement of the system is characterized in that at least one oscillator component is provided which has a second circuit for generating an output signal with a predefined frequency, the reference time basis forming the basis of the configuration of the circuit. The output signal with the predefined frequency is thereby able to be generated very accurately.

In another advantageous further refinement of the method in accordance with the present invention, the sensor data of the yaw rate sensor are processed on the basis of the reference time basis, in particular in that the relative spatial orientation of the yaw rate sensor is ascertained by integrating the sensor data of the yaw rate sensor while taking the clock frequency and the deviation into account. In this way, a very precise sensing behavior of the sensor is advantageously able to be provided.

In another advantageous further refinement of the method in accordance with the present invention, the reference time basis is used for calibrating and/or correcting an independent time basis generated by a further system component. The independent time basis generated by the further system component is able to be developed very precisely as a result.

In another advantageous further refinement of the method in accordance with the present invention, the calibration and/or correction of the independent time basis is carried out at selectable instants during the sensor operation of the yaw rate sensor. This supports an energy-efficient operation of the yaw rate sensor.

In another advantageous further refinement of the method in accordance with the present invention, the yaw rate sensor is activated especially for the calibration and/or correction of the independent time basis. This, too, supports an energy-efficient operation of the yaw rate sensor.

In another advantageous further refinement of the system in accordance with the present invention, the reference time basis is used for setting the frequency of the output signal of an oscillator component. This makes it possible to provide the frequency of the output signal of the oscillator component in a very precise manner.

Below, the present invention is described in greater detail with further features and advantages based on a plurality of figures. Identical or functionally equivalent elements have been provided with the same reference numerals in the figures.

Described method features similarly result from corresponding described device features, and vice versa. This particularly means that features, technical advantages and embodiments with regard to the system similarly result from corresponding embodiments, features and advantages with regard to the method for operating a sensor system, and vice versa. For the sake of simplicity, only changes from the previous figures are described in the figures.

BRIEF DESCRIPTION OF THE DRAWINGS

FIG. 1 shows a conventional system.

DETAILED DESCRIPTION OF EXAMPLE EMBODIMENTS

Figure 2:
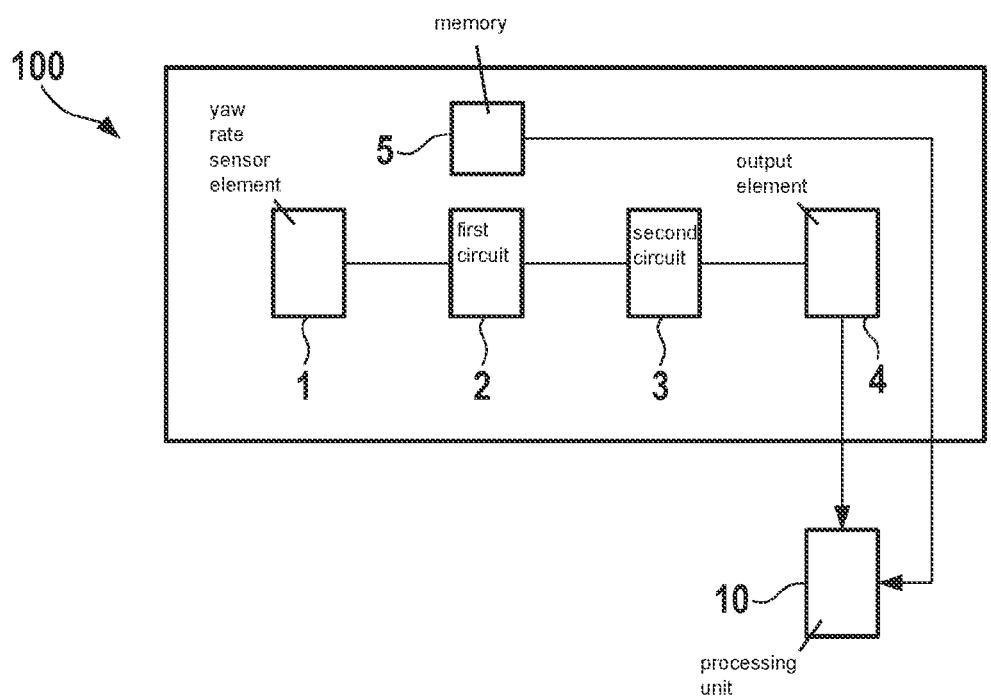
FIG. 2 shows a first embodiment of a system in accordance with the present invention.

With the aid of the system according to the present invention, it is advantageously possible to take a deviation factor produced when generating the sampling rate by the fractional phase-locked loop into consideration in the processing of the measured yaw rate values without requiring a further frequency normal for this purpose. The high precision and stability of the MEMS oscillator is to be utilizable in the process.

With the aid of the present method, it is advantageously possible to determine and store the parts-individual deviation $a_{odr}$ already during the production when the yaw rate sensor is calibrated, this value being provided for later use in the processing of the sensor data.

Advantages of the system and method in accordance with the present invention include:
The precision of the sensor data processing is increased without requiring a further time normal for this purpose;
the MEMS oscillator makes it possible to provide a highly precise time basis also for other purposes of the sensor data processing or a time/frequency measurement without additional costs.

FIG. 1 shows a conventional system 100 in the form of a sensor system. System 100 includes a yaw rate sensor element 1 as a clocking system component 1, which is equipped with a first circuit 2, the first circuit 2 including a PLL and furthermore a register which includes values for the PLL, whereby a clock frequency or an output data rate f_odr is generated from the oscillation frequency of the clocking system component, which is to be understood as the sampling rate of the sensor signal.

With the aid of an output element 4, a signal is output to a processing unit 10 at output data rate f_odr.

FIG. 2 shows a first embodiment of a system 100 according to the present invention, which is embodied as a sensor system. First memory 5 in which deviation a_odr is stored and able to be transmitted to processing unit 10 can be seen in this variant. In the exemplary embodiment illustrated in FIG. 2, this memory is part of clocking system component 1, i.e., of the yaw rate sensor element. Processing unit 10 may be embodied as a host system (e.g., an application processor), which integrates, i.e., sums, the yaw rate signal in synchrony with the output data rate and corrects it by deviation a_odr.

Deviation a_odr is a factor for individual parts, which is determined a single time during the production of the yaw rate sensor.

The yaw rate sensor signals may be used for determining an orientation, for example, in that the sampling values of the sensor signal are summed over time. If actual sampling period Δt_real=1/f_odr deviates from setpoint sampling period Δt_nom=1/f_odr_nom in the process, then this results in an error which is able to be corrected by the known deviation a_odr in the following way.

The correction in the algorithm is realized in a space axis in the following manner:

$$\varphi = \sum \omega \cdot \Delta t\_real$$

$$\Delta t\_real = 1/f\_odr$$

$$\Delta t\_nom = 1/f\_odr\_nom$$

$$f\_odr = f\_odr\_nom * a\_odr$$

$$\Delta t\_real = \frac{1}{f\_odr\_nom * a\_odr} = \frac{\Delta t\_nom}{a\_odr}$$

Figure 3:
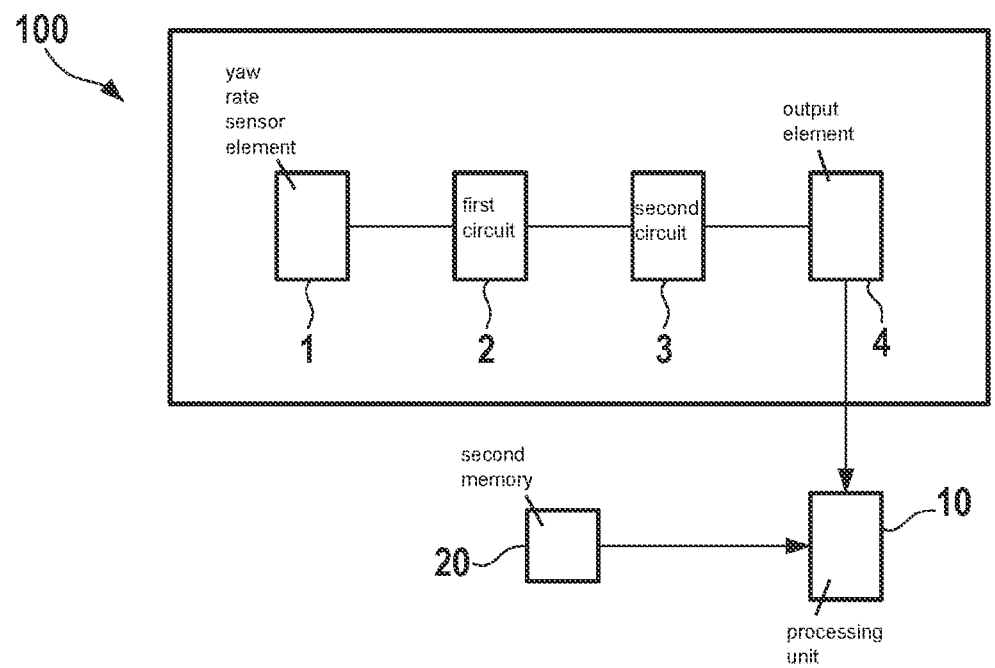
FIG. 3 shows a second embodiment of a system in accordance with the present invention.

-continued $$\varphi = \sum \omega \cdot \frac{\Delta t\_nom}{a\_odr}$$

where:
φ . . . the angular sum across a set of yaw rate sensor values ω
Δt_real . . . the actual sampling period
Δt_nom . . . the setpoint sampling period
f_odr . . . the actual sampling frequency
f_odr_nom . . . the setpoint sampling frequency
a_odr . . . the deviation factor of the sampling frequency FIG. 3 shows a further embodiment of provided system 100.

In this case, external second memory 20 is provided which stores deviation a_odr and is able to transmit it to processing unit 10. For example, external memory 20 could be a memory of processing unit 10 or of the host system, or a database including trimming parameters made available by the manufacturer, or a Cloud which the user of the sensor system is able to access.

Figure 4:
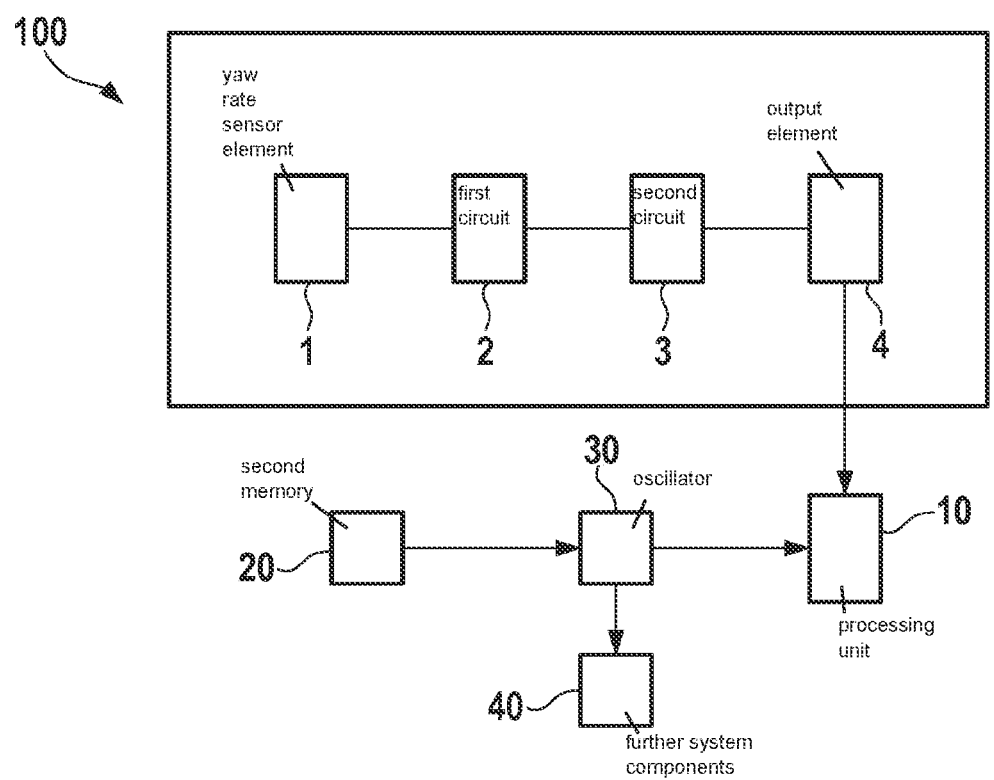
FIG. 4 shows a third embodiment of a system in accordance with an example embodiment of the present invention.

FIG. 4 illustrates a further embodiment of provided system 100. It can be seen that externally developed second memory 20 for storing deviation a_odr is provided in this variant as well. In this particular exemplary embodiment, output data rate f_odr of yaw rate sensor 1 is used for generating a time basis with the aid of an oscillator 30, the time basis forming the foundation of the processing of the yaw rate sensor signals, but also being usable at some other location in the system. In addition, deviation a_odr is conveyed to oscillator 30 so that the time basis generated by oscillator 30—although derived from the parts-individual natural frequency of the yaw rate sensor element—is independent thereof. The time basis of oscillator 30 is conveyed to processing unit 10, and processing unit 10 bases the integration of the yaw rate sensor signal on the oscillator frequency corrected in this way.

Instead of the direct use in the sensor data-processing algorithm, deviation a_odr is used for calibrating or compensating an independent time basis, for instance in order to calibrate an imprecise RC oscillator in a downstream processing unit 10 in the form of a sensor hub (e.g., a microcontroller for processing sensor data).

This offers the advantage that the precision of the time basis is used not only for processing the yaw rate sensor signals but may also be used for processing other sensor data.

If required, oscillator 30 is also able to supply still further system components with an independent time basis such as sensors or processing units 40.

Oscillator 30 may also be embodied as a precise fractional PLL or FLL (frequency-locked loop) featuring a divider ratio n1/m1 in order to supply downstream components 40 with an output signal having a highly precise frequency. In this case, deviation a_odr is used to generate a precise frequency signal on the basis of output sampling rate f_odr of the sensor and deviation a_odr. Divider ratio n1/m1 of precise fractional PLL or FLL is corrected by value a_odr.

In this way, for instance, frequency normals for radio transmitters and/or radio receivers (e.g., Bluetooth) for the operation of serial interface components (UART, USB, etc.) are able to be generated without requiring further quartzes for this purpose.

In a further embodiment of system 100, which is developed as a sensor system, the independent time basis is calibrated only when the yaw rate sensor is switched on.

When the yaw rate sensor is switched off, the independent time basis continues running with its inherent precision. This variant is advantageous because the yaw rate sensor has a relatively high electrical energy consumption (e.g., 950 μA) which is greater by orders of magnitude than the current consumption of a time basis based on an RC oscillator (e.g., 300 nA). Moreover, the high precision of the time basis is thereby predominantly provided when yaw rate sensor signals are to be processed.

Depending on the application case, it is also possible that the yaw rate sensor is selectively connected to calibrate the independent time basis whenever high precision is demanded, even if this is not necessarily done for processing yaw rate sensor signals.

Although system 100 has been described as a yaw rate sensor system throughout the previous text, by which a compensation of a trimming error is possible in order to determine a highly precise time basis for the processing of sensor signals, it is also possible that clocking system component 1 is a micromirror and that system 100 is developed as an optical system such as a micro-projector system.

What is claimed is:

1. A system, comprising:
    a clocking system component, including:
        a micromechanical oscillation element, which is able to be induced to an oscillation with a natural frequency, and
        a first circuit configured to generate from the natural frequency of the oscillation element a clock frequency, that is pre-calibrated to a predefined setpoint clock frequency,
    wherein a remaining deviation of the clock frequency from the setpoint clock frequency is stored, the deviation having been individually determined for the clocking system component; and
    a processing unit configured to generate a reference time basis for at least a part of the system based on the generated clock frequency and the stored deviation.

2. The system as recited in claim 1, wherein the system is a sensor system, and a yaw rate sensor having a micromechanical sensor structure is the clocking system component, the oscillation element is developed in the sensor structure, which is induced to oscillations with the natural frequency for a measured signal acquisition, wherein the first circuit generates from the natural frequency the clock frequency, the clock frequency determining an output sampling rate for sensor data of the yaw rate sensor, and wherein the processing unit is configured to process the sensor data based on the reference time basis.

3. The system as recited in claim 1, wherein the first circuit includes at least one phase-locked loop configured to generate the clock frequency.

4. The system as recited in claim 1, wherein the clocking system component and/or the processing unit has a first memory for storing the deviation.

5. The system as recited in claim 1, wherein the clocking system component and/or the processing unit has access to an external second memory for storing the deviation.

6. The system as recited in claim 1, further comprising:
    at least one further system component configured to generate an independent time basis, and the independent time basis of the further system component is able to be calibrated and/or corrected based on the reference time basis.

7. The system as recited in claim 1, wherein at least one oscillator component of the micromechanical oscillation element has a second circuit configured to generate an output signal with a predefined frequency, the configuration of the circuit being based on the reference time basis.

8. A method for operating a sensor system having a micromechanical yaw rate sensor in whose sensor structure at least one oscillation element is developed, in which the oscillation element is induced to oscillations with a natural frequency for a measured signal acquisition, the method comprising the following steps:
    generating a clock frequency from the natural frequency of the oscillation element, which is pre-calibrated to a predefined setpoint clock frequency and which determines an output sampling rate for sensor data of the yaw rate sensor;
    storing an individually remaining deviation of the clock frequency for the yaw rate sensor from the setpoint clock frequency; and
    based on the generated clock frequency and the stored deviation, generating a reference time basis for at least a part of the sensor system.

9. The method as recited in claim 8, wherein the sensor data of the yaw rate sensor are processed based on the reference time basis, a relative spatial orientation of the yaw rate sensor being ascertained by integrating the sensor data of the yaw rate sensor while taking the clock frequency and the deviation into account.

10. The method as recited in claim 8, wherein the reference time basis is used for calibrating and/or correcting an independent time basis that is generated by a further system component.

11. The method as recited in claim 10, wherein the calibration and/or correction of the independent time basis is carried out at selectable instants during a sensor operation of the yaw rate sensor.

12. The method as recited in claim 10, wherein the yaw rate sensor is activated for the calibration and/or correction of the independent time basis.

13. The method as recited in claim 8, wherein the reference time basis is used for setting a frequency of an output signal of an oscillator component.

* * * * *